(12) United States Patent
Kent

(10) Patent No.: US 9,176,623 B2
(45) Date of Patent: Nov. 3, 2015

(54) METHOD AND A TOUCH SENSING DEVICE FOR IMPLEMENTING THE METHOD

(75) Inventor: Joel C. Kent, Fremont, CA (US)

(73) Assignee: Elo Touch Solutions, Inc., Milipitas, CA (US)

( * ) Notice: Subject to any disclaimer, the term of this patent is extended or adjusted under 35 U.S.C. 154(b) by 590 days.

(21) Appl. No.: 13/164,228

(22) Filed: Jun. 20, 2011

(65) Prior Publication Data

US 2012/0166145 A1 Jun. 28, 2012

Related U.S. Application Data

(63) Continuation-in-part of application No. 12/975,663, filed on Dec. 22, 2010, now abandoned.

(51) Int. Cl.
*G06F 15/00* (2006.01)
*G06F 3/041* (2006.01)
*G06F 3/043* (2006.01)

(52) U.S. Cl.
CPC ............ *G06F 3/0418* (2013.01); *G06F 3/0433* (2013.01)

(58) Field of Classification Search
USPC ........................................................ 702/191
See application file for complete search history.

(56) References Cited

U.S. PATENT DOCUMENTS

| 7,411,581 B2 | 8/2008 | Hardie-Bick |
| 2004/0160421 A1* | 8/2004 | Sullivan ........................ 345/173 |
| 2007/0188476 A1 | 8/2007 | Bayramoglu et al. |
| 2009/0195517 A1 | 8/2009 | Duheille et al. |

FOREIGN PATENT DOCUMENTS

WO WO2010/149365 12/2010

OTHER PUBLICATIONS

Sathish Kumar, The effects of damping treatment on the sound transmission loss of honeycomb panels, Stockholm Apr. 2010, Vinnova Centre of Excellence for ECO2 Vehicle Design The Marcus Wallenberg Laboratory for Sound and Vibration Research Department of Aeronautical and Vehicle Engineering, p. 1-30.*
Marieke Hannink, Acoustic Resonators for the Reduction of Sound Radiation and Transmission, Copyright _c 2007 by M.H.C. Hannink, Enschede, The Netherlands, 182 pages.*
Mustafa Baris Kiyar, Active/Passive control of fluid-borne and structure-borne disturbances in fluid-filled piping systems, Blacksburg, Virginia, Nov. 14, 2003, 182 pages.*

* cited by examiner

*Primary Examiner* — Tung S Lau
(74) *Attorney, Agent, or Firm* — Alston & Bird LLP

(57) ABSTRACT

The present invention relates to a method for reducing noise in a signal sensing a bending wave propagating in an object comprising the steps of: receiving a sensed signal representative of a plurality of locations of the object, and fitting a function satisfying bending wave propagation properties to the sensed signals, thereby reducing noise contributions to the sensed signals not satisfying the bending wave propagation properties. By doing so, noise contributions not satisfying the wave propagation properties can be suppressed from the sensed signal, thereby improving the signal-to-noise ratio.

17 Claims, 4 Drawing Sheets

METHOD AND A TOUCH SENSING DEVICE FOR IMPLEMENTING THE METHOD

CROSS-REFERENCE TO RELATED APPLICATIONS

This application is a continuation-in-part of U.S. patent application Ser. No. 12/975,663 filed Dec. 22, 2010 now abandoned, which is hereby incorporated in its entirety by reference for all purposes.

BACKGROUND

The present invention relates to a method for determining an acoustic response attributed to a location of an impact, like a touch event on a surface of an object, and a touch sensing device implementing the method.

Methods to determine the location of an impact on a surface of an object based on analysing acoustic signals are already known in the art. This kind of technology is based on measuring the acoustic signal using one or more sensors to obtain an acoustic signature of the impact and to compare the signature with a predetermined set of acoustic signatures, wherein each predetermined acoustic signature is representative for a given location of the haptic or tactile interface. The location of the impact is then identified based on the similarity of its acoustic signature with one of the predetermined acoustic signatures. FIG. 1 schematically illustrates such a prior art device with an interaction surface 101 and two transducers 103.

It has also been observed, that the predetermined set of acoustic signatures generated by computing the individual acoustic pattern of closely spaced locations 105 on the surface of a haptic interface during the calibration of the device as illustrated in FIG. 1 and described above, can be falsified due to some spurious noise contributions to the sensed signals during the calibration phase. To obtain a desired precision unwanted noise sources need to be identified and the experimental set-up adapted accordingly. This represents a tedious and time consuming activity and in addition it is not always possible to identify all unwanted contributions.

It is therefore the object of the invention to provide a method for reducing noise contributions to sensed acoustic signals.

SUMMARY OF THE INVENTION

The object of the invention is achieved with the method for reducing noise in a signal sensing a bending wave propagating in an object comprising the steps of: a) receiving a sensed signal representative of a plurality of locations of the object, and b) fitting a function satisfying bending wave propagation properties to the sensed signals, thereby reducing noise contributions to the sensed signals not satisfying the bending wave propagation properties. Thereby noise not satisfying the physical principles underlying the wave propagation in an object is suppressed or at least reduced and thereby the signal-to-noise ratio of the sensed signals can be improved.

Preferably, the object is a uniform plate with a thickness less than the bending wave wavelength and step b) comprises fitting a function satisfying the Helmholtz equation to the sensed signal. Physical principles underling the wave propagation in such a uniform plate can be well approximated by the Helmholtz equation, but any other kind of approximations in the field of wave propagation could also be considered. In particular, the function used in step b) can be a Bessel function or an expansion of the Bessel function up to an nth order. Bessel functions solve the Helmholtz equation, thus physically meaningful fits can be carried out. Advantageously, the fitting can be carried out such that the bending wave dispersion relation $$k = \sqrt{\omega}\left[\frac{12(1-v^2)\rho}{Eh^2}\right]^{1/4},$$

with $\omega$ being the angular frequency of the bending wave propagating in the object, E, $v$ and $\rho$ being respectively the modulus of elasticity, the Poisson's ratio and the density of the object and h being the thickness of the object, is satisfied. By choosing the order up to which one wants to use the Bessel function expansion, it is possible to achieve the desired precision.

Advantageously, the fitting function can furthermore comprise a bending wave attenuation contribution. Thus an even more realistic model can be prepared to effectively reduce noise contributions not satisfying the physics of the wave propagation.

Preferably, fitting can be carried out for a given location on the object based on the sensed signal corresponding to the given location and a predetermined amount of neighbouring locations for which a sensed signal has been received. Advantageously, the sensed signals can be received from node locations of a grid and for each location the fitting step is carried out for a sub-grid, in particular a five by five sub-grid, with the centre of the sub-grid being the location for which the fitting is carried out. This will simplify coding of the fitting process as not all measured data has to taken into account.

According to a preferred embodiment, the method can comprise a step c1) of providing a bending wave in an object using a transducer, in particular a piezoelectric transducer, located at a first transducer position on the object, wherein step a) comprises sensing the signals at locations on the object different to the first position and wherein the sensed signal is representative of a bending wave parameter at the at least one second location.

Advantageously, the step a) can comprises sensing the signals using a vibrometer. The vibrometer could be a non contact laser interferometer sensing the deflection of a bending wave, an atomic force microscope or any other means that measures surface motion.

Preferably, steps c1), a) and b) are repeated for providing a plurality of bending waves with different frequencies within a predetermined frequency range and sensing signals for each one of the bending waves. By sweeping the frequency range of interest, a more complete set calibration data can be achieved.

Preferably, step c1) comprises providing a continuous oscillating voltage to the transducer with angular frequency $\omega$. This gives directly access to the frequency $\omega$ contribution to the frequency $\omega$ Fourier component of a time domain signal.

According to a variant, the method can comprise a step c2) of providing a predetermined touch event at a location of the object and, step a) comprises sensing the signals with a transducer, in particular a piezoelectric transducer, at a first position of the object different to the plurality of locations of the object. In this case a time domain signal is sensed by the transducers, but still acoustic responses in the frequency domain can be determined using a Fourier transformation.

Advantageously, steps c2), and a) can be repeated for a plurality of locations of the object, before proceeding with step b). Thus sufficient data to obtain a precise fit can be collected.

Preferably, the transducer can be positioned outside of an area of interest of the object, in particular outside a touch sensitive interaction surface of the object.

According to a preferred embodiment, the method further can comprise after step b), a step d) of replacing the sensed signals by the fitted values and a step e) of determining acoustic transfer functions for each location of the object for which a fitted value has been established in step b) with respect to the first transducer position. Thus improved calibration look-up tables can be achieved.

Advantageously, steps c1) or c2) and step a) and step b) can be repeated for a plurality of transducers placed at different positions of the object. Preferably, step e) can comprise determining phase differences between acoustic responses of two different transducers. Thus phase difference profiles also can be established.

The invention also relates to a computer readable medium including computer executable instructions stored thereon for performing the method as described above in relation to the third object of the invention.

The invention also relates to a touch sensing device comprising: an interaction surface, at least one transducer, and a control means configured for performing the method as described above.

BRIEF DESCRIPTION OF DRAWINGS

Advantageous embodiments of the inventive method and the device will be described in the following by referring to the Figures.

DETAILED DESCRIPTION OF SPECIFIC EMBODIMENTS

In the following, features and advantageous embodiments of the method and the device according to the invention will be described in detail.

Figure 2:
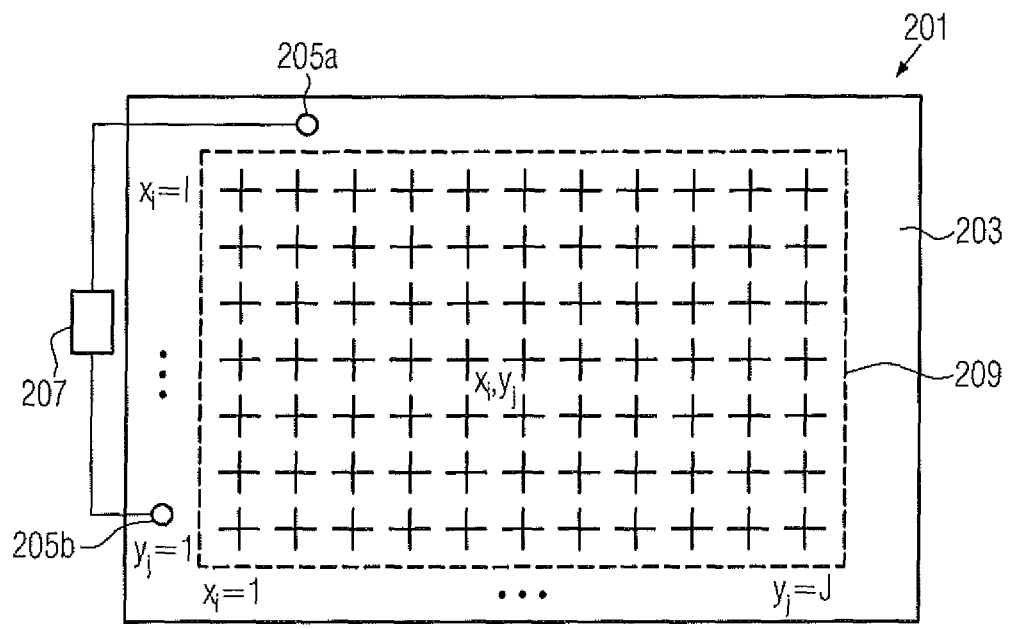
FIG. 2 schematically illustrates a touch sensing device configured to carry out a method according to a first embodiment of the invention.

FIG. 2 illustrates a two-dimensional schematic view of a touch sensing device 201 using a method according to a first embodiment for reducing noise in a signal sensing a bending wave propagating in an object, here a touch sensing device 201, according to the invention.

The touch sensing device 201 comprises an interaction surface 203, e.g. a glass plate or the like, and at least one transducer 205. In this embodiment, the touch sensing device 201 comprises two transducers 205a, 205b, e.g. piezoelectric transducers, capacitive piezoelectric transducers, magnetostrictive piezoelectric transducers, electromagnetic piezoelectric transducers, acoustic velocimeters, accelerometers, optical sensors, MEMS or any device capable of transforming an acoustic signal into an electric one and visa versa. The coupling between the transducers 205a and 205b and the interaction surface 203 is achieved by a fastening means, which can be a tape, glue or the like. Depending on the configuration of the device, more than two transducers or only one transducer can be provided.

The touch sensing device 201 is configured to identify the location of a touch event, like an impact or a dragging over the surface or a multi-touch event. This touch location information can then be used to control an input of an electronic device, such as a hand-held electronic device, a computer or any kind of machine comprising a touch sensitive interface. The signal and data treatment to provide this functionality is provided by control means 207.

To do so, the control means 207 analyses the acoustic signals received from the transducers 205a and 205b and an acoustic signature is determined. By comparing this measured acoustic signature with a set of predetermined acoustic signatures stored in a lookup table, e.g. within the control means 207, the location of an impact on the interaction surface 203 is determined.

Figure 1:
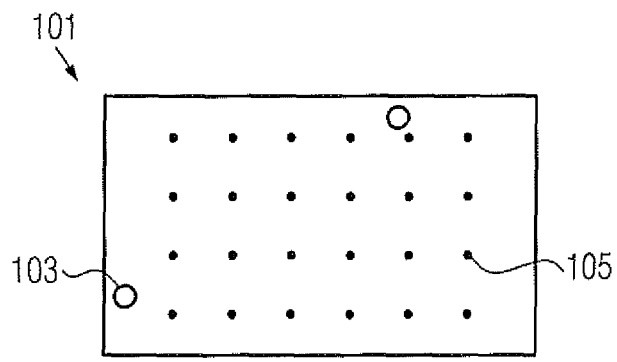
FIG. 1 illustrates a two-dimensional schematic view of a touch sensing device, as known from the prior art, comprising an interaction surface, wherein locations on the surface of the touch sensing device at which acoustic responses are acquired are shown (in points).

During the calibration of the touch sensing device 201 the predetermined signatures stored in the lookup table have to be determined. Here the lookup table is determined using an experimental set-up. The lookup table thus comprises calibration acoustic signatures for a plurality of locations $x_i$, $y_j$ which are typically regularly distributed over the touch sensitive part of the device on the interaction surface 203. In FIG. 1, the locations for which the predetermined signatures are determined during calibration are illustrated by the grid of + signs of locations $x_i$, $y_j$ within the area of interest 209, which can also be called the touch area.

Figure 3:
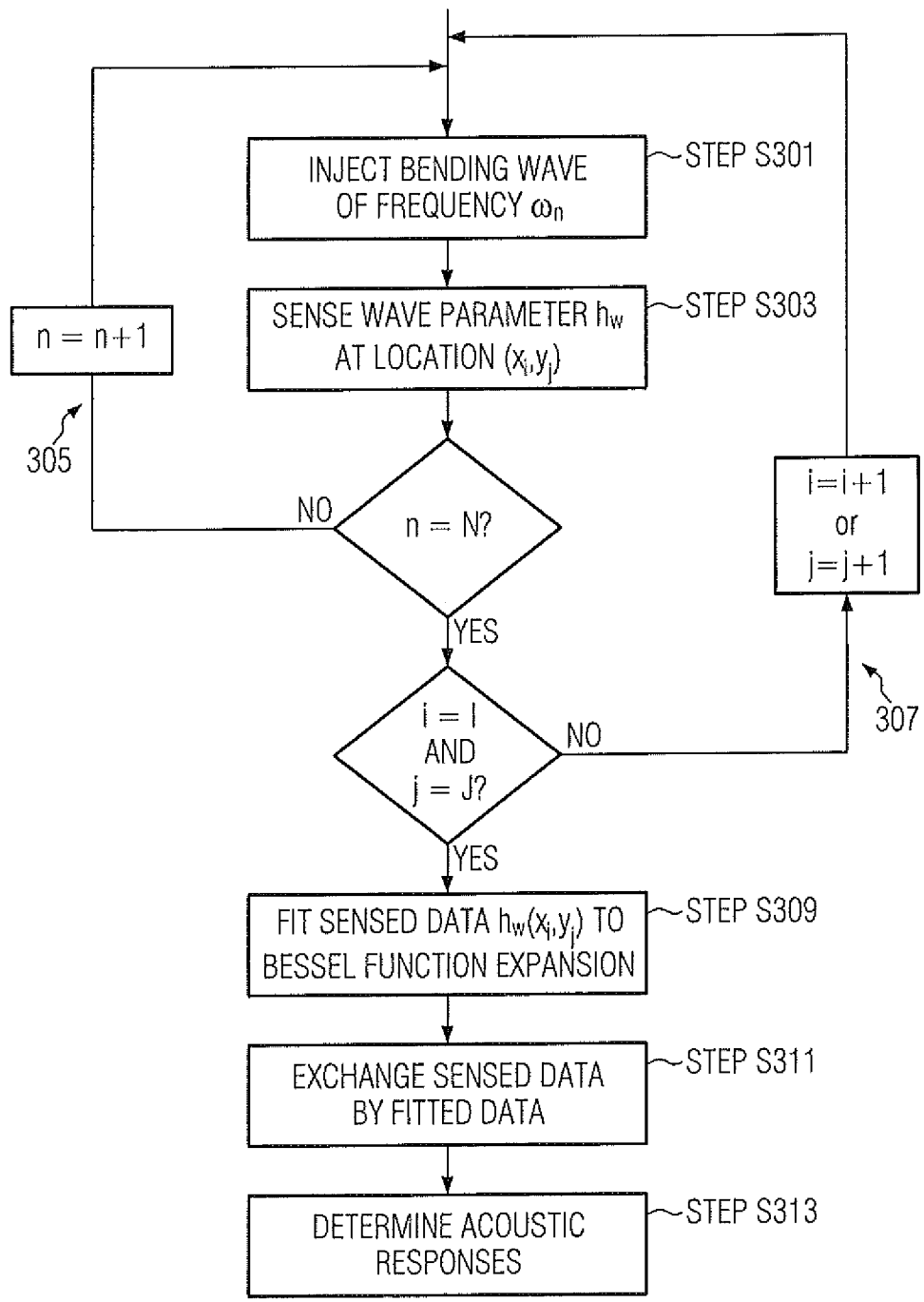
FIG. 3 illustrates a block diagram showing the steps of the method according to the first embodiment.

FIG. 3 illustrates the method according to the first embodiment of the invention which is used by the control unit 207 to determine the acoustic signatures during the calibration stage.

The method starts with Step S301 during which the control unit 207 applies a driving or actuating signal to the transducer 205a or 205b. By exciting the transducer 205a, 205b with a continuous oscillating voltage of angular frequency $\omega$, a bending wave with frequency $\omega$ will propagate through the interaction surface 203.

During step S303, a parameter representative of the propagating bending wave is sensed at location ($x_i$, $y_j$). The parameter of interest could be the complex function $h_\omega(x_i, y_j)$ being the resulting height of deflection of the interaction surface 203 due to the propagating bending wave as a function of the grid locations ($x_i$, $y_j$). In this function, the real part is in phase with the transducer excitation signal and the imaginary part is 90° out of phase.

Steps S301 and S303 are then repeated for a predetermined amount of different frequencies $\omega$, during loop 305 and repeated for all grid locations illustrated in FIG. 2 during loop 307. While not shown in FIG. 2, the process is repeated once for each transducer, for example first for transducer 205a and then again for transducer 205b. The preferred frequency range is the audio frequency ranging from about zero to about 20 kHz, however frequencies of up to 40 kHz or even 100 kHz could also be considered depending on the circumstances. The waves of various frequencies could also be provided in a frequency sweep.

To measure $h_\omega(x_i, y_j)$, a vibrometer, for instance a non-contact laser interferometer or an atomic force microscope, can be used.

If $h_\omega(x_i, y_j)$ is measured at each calibration grid location ($x_i$, $y_j$), the inventive method according to the fifth embodiment proposes to reduce noise contributions in the measurement by fitting the measured data to a function that obeys the laws of physics underlying the acoustic wave propagation in the interaction surface 203. Using a function satisfying bending wave propagation properties to fit the measured data, noise contributions to the sensed signals not satisfying the bending wave propagation properties can be reduced.

In fact, the measured data has to obey the Helmholtz Equation which can be expressed as follows:

$$\partial^2 h_\omega/\partial X^2 + \partial^2 h_\omega/\partial Y^2 + k^2 h_\omega(X,Y) = 0 \quad (1)$$

In an alternative notation, Helmholtz Equation can also be written as follows:

$$(\nabla^2 + k^2) h_\omega(X,Y) = 0 \quad (2)$$

The wave number k is determined by the bending wave dispersion relation given in Equation 7 as already mentioned above.

$$k = \sqrt{\omega} \left[ \frac{12(1-v^2)\rho}{Eh^2} \right]^{1/4} \quad (3)$$

The Helmholtz Equation (2) and the dispersion relation (3) apply to bending waves propagating in a uniform plate whose thickness is much less than the bending wave wavelength, which represents the typical case for interaction surfaces 203 of touch sensitive devices 201. Indeed, physical principles underling the wave propagation in such a uniform plate can be well approximated by the Helmholtz equation, but any other kind of approximations in the field of wave propagation could also be considered.

A suitable function satisfying the Helmholtz Equation and the dispersion relation is the Bessel Function, which can be expressed by the following Bessel Function expansion:

$$h_\omega(X,Y) = h_\omega(R,\phi) = \sum_{n=0}^{N} \alpha_n J_n(kR)\cos(n\phi) + \sum_{n=1}^{N} \beta_n J_n(kR)\sin(n\phi) \quad (4)$$

In the Bessel Function expansion of Equation (4), the coordinates have been expressed in polar coordinates R and Φ, for instance around the interaction surface 203 center point. $\alpha_n$ and $\beta_n$ are the coefficients of the Bessel expansion of order n and $J_n$ are Bessel Functions of the first kind of the order n.

During step S309 the measured data is fitted to the expansion (4) with the desired order N for each one of the frequencies ω of loop 305. Thus noise contributions over the interaction surface 203 not satisfying the Helmholtz Equation will be rejected by this fitting process and thus the fitted data will better reflect the acoustic propagation through the interaction surface 203.

Of course the higher the order N up to which the expansion is used for fitting purposes, the better the results. However, calculation power necessary to carry out the fit will also rise. Typically N will be about 100 or less, preferably in a range of 2 to 50. The expansion can be stopped when further Bessel function terms become essentially zero.

The invention is not limited to using Bessel functions to reflect solutions to the Helmholtz equation. For instance, the Bessel function expansion could be centered around other points in the touch area, for example, a point closer to the excitation transducer instead of the center point. As an alternative, the abovementioned wave superposition method could also be used where solutions to the Helmholtz equation inside the interaction surface 203 are built from a superposition of wave motion in the touch area due to hypothetical point like bending wave sources at auxiliary locations. Thus, the principle underlying this invention is to apply any mathematical means to fit the measured $h_\omega(x_i, y_j)$ to a superposition of solutions to the Helmholtz Equation, wherein the choice is a matter of mathematical and coding convenience.

According to one practical example, the coding of step S309 is simplified by taking into account only a limited region around a given grid location $(x_i, y_j)$ for the fitting.

Figure 4:
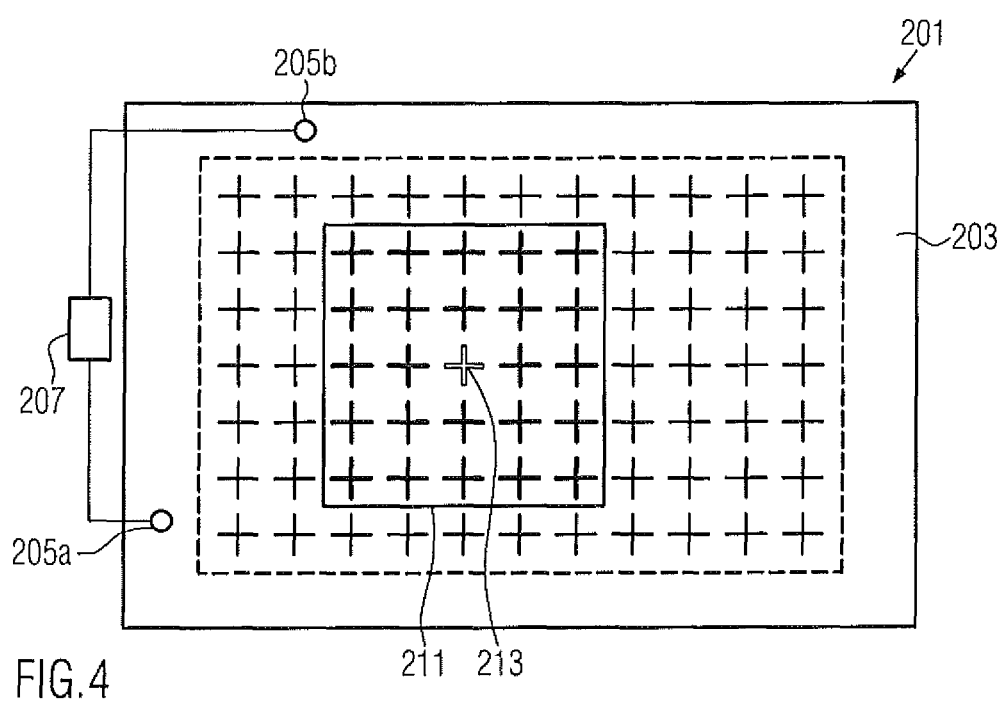
FIG. 4 illustrates the touch sensing device of FIG. 2 in a variant of the first embodiment.

This is schematically illustrated in FIG. 4. FIG. 4 illustrates the touch sensing device 201 of FIG. 2 with the interaction surface 203, the transducers 205a and 205b as well as the control unit 207. The practical example for fitting the data of step S209 consists in choosing a 5×5 sub-grid 211 around a centre grid location 213. The measured data of that 5×5 sub-grid is then used for the Bessel function expansion which is centered on the selected grid position 213. Once the fit is carried out, the fitted value at location 213 will reduce to $\alpha_0$, as only the first term in the Bessel expansion is non-zero for R=0. In this practical example N is of the order of 10 or less, typically 2 to 5. Instead of a 5×5 sub grid, it is of course also possible to use a different sub grid e.g. 3×3 or 7×7. The choice of these sub-grids has the advantage that they are centered around a central node. Nevertheless other forms of sub-grid, rectangular instead of square etc. could also be used.

Having carried out the fit in step S309, the method according to the fifth embodiment proceeds with step S311 during which the sensed values $h_\omega(x_i, y_j)$ are replaced by the corresponding fitted value determined in step S309.

Note that the fit in step S309 is not simply a smoothing of the data for the sensed values $h_\omega(x_i, y_j)$, but indeed rejection of noise components of the sensed values that do not correspond to physically possible bending wave motion. Simple smoothing of the sensed values $h_\omega(x_i, y_j)$ relies on the assumption that sensed values $h_\omega(x_i, y_j)$ are a continuous or smooth function of horizontal position x, vertical position y or frequency ω but takes no account of the equations of motion of bending waves. For example, a spatial smoothing in which $h_\omega(x_i, y_j)$ is replaced by the average value of its for closest neighbors $\{h_\omega(x_{i+1}, y_j) + h_\omega(x_i, y_{j+i}) + h_\omega(x_{i-1}, y_j) + h_\omega(x_i, y_{j-1})\}$ would suppress random noise in the sensed values $h_\omega(x_i, y_j)$ but in the hypothetical limit of noise free measurements would degrade the sensed values $h_\omega(x_i, y_j)$. In contrast, by requiring that fitted values satisfy the laws of physics, that is the bending wave equation, we suppress variations due to noise without also suppressing variations due to desired bending wave signals.

Then, during step S313, using the principles of time reversal acoustics, the fitted $h_\omega(x_i, y_j)$ data can be reinterpreted as the signal generated by the transducer 205a or 205b, no longer being in the transmitting mode but in a receiving mode due to a continuous wave excitation of frequency ω at location $(x_i, y_j)$. With a tap at a location $(x_i, y_j)$ corresponding to a delta distribution at first approximation, $h_\omega(x_i, y_j)$ can actually also be interpreted as a frequency ω Fourier component of the time domain signal $h_{i,j}(t)$ sensed by a transducer 205a,205b due to an impulse tap, for instance of a robot calibration machine at location $(x_i, y_j)$ on the interaction surface 203. Thus the acoustic transfer functions between an input at location $(x_i, y_j)$ and the transducer output can be established as a function of frequency and location $(x_i, y_j)$.

When the method according to the first embodiment illustrated in FIG. 3 is carried out for a plurality of transducers, the acoustic responses determined during step S313 can be used to establish more complex acoustic signatures, e.g. phase difference calibration data. For instance, in the case of the two transducers 205a and 205b of the touch sensing device of FIG. 2, the phase difference profile would comprise the phase angle of the complex number $h1_{i,j}(\omega) h2_{i,j}(\omega)*$ where * relates to the complex conjugation. In case a third transducer is used, the phase difference profiles with respect to the first and second transducer can be established accordingly.

Figure 5:
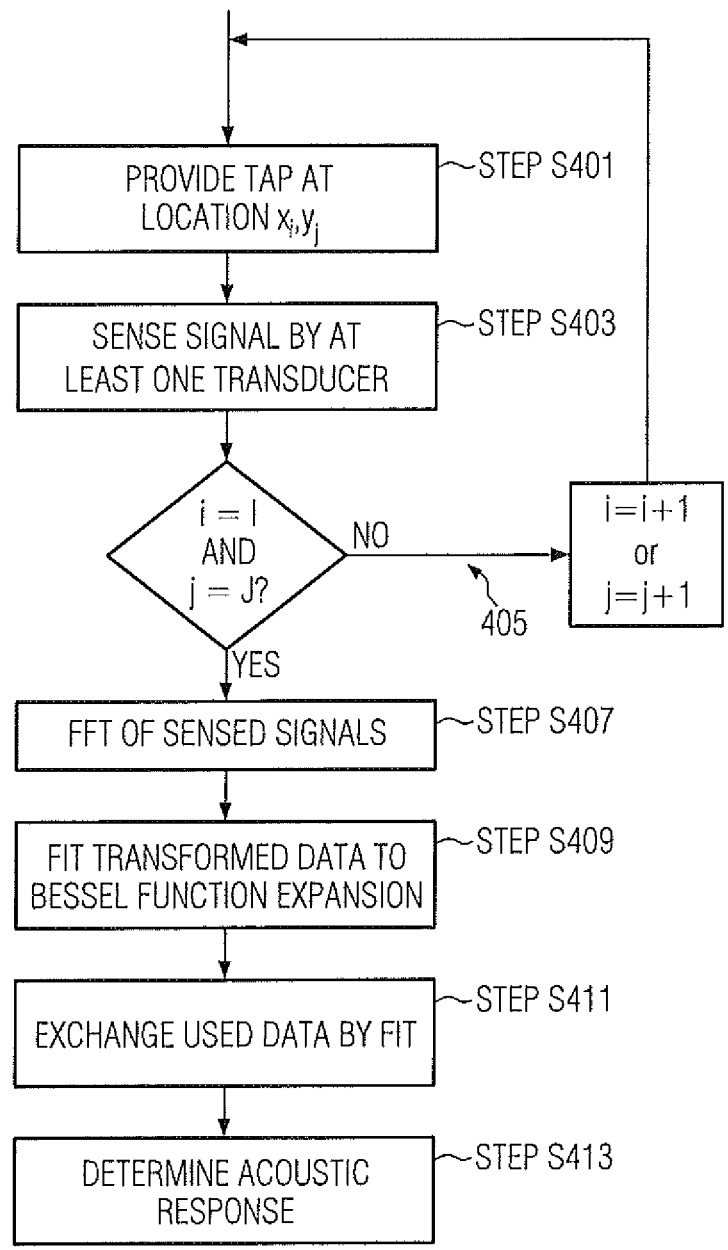
FIG. 5 illustrates a block diagram showing the steps of the method according to a second embodiment.

FIG. 5 illustrates a method for reducing noise in a signal sensing a bending wave propagation in an object according to a second embodiment.

The method according to the second embodiment can be carried out to establish calibration data of a touch sensitive device 201 as illustrated in FIG. 2. In contrast to the first embodiment, the second embodiment proposes not to inject bending waves using the transducers 205a and 205b of the touch sensor device 291, but to use a robotized calibration device, being a tool for applying a mechanical excitation to the interaction surface 203 at a grid location $(x_i, y_j)$. The device can comprise a rigid tip, such as a pike or a small ball made of any rigid material such as metals or the like, to transmit a predetermined excitation tap upon the interaction surface 203. The device may further comprise a transducer to convert an electric signal into a mechanical excitation, such as an electromagnetic shaker, a piezoelectric transducer, capacitive piezoelectric transducers, magnetostrictive piezoelectric transducers or the like. The tap can be applied either by making a contact between the tip and the interaction surface 203 at locations $(x_i, y_j)$ or by moving the tip quickly up and down to briefly strike the interaction surface 203. The device is thus configured to transmit the mechanical excitation in a broad frequency range, at least corresponding to the range of interest for touch sensitive applications based on the detection of acoustic signals. The preferred frequency range is the audio frequency ranging from about zero to about 20 kHz, however frequencies of up to 40 kHz or even 100 kHz could also be considered depending on the circumstances.

To be able to know the properties of the excitation, a reference device such as a force sensor, a strain gauge or any sensor able to measure mechanical quantity is used.

The method according to the second embodiment starts with step S401, which thus consists in providing a predetermined tap at one of the locations $(x_i, y_j)$ by the robotized calibration device. During step S403, the transducers 205a and/or 205b sense an acoustic signal corresponding to the acoustic bending wave injected by the tap at their respective transducer positions. Steps S401 and S403 are then repeated during loop 405 for all grid locations $(x_i, y_j)$ (i=1–I, j=1–J).

To bring the sensed signals from the time domain into the frequency domain, a Fourier transformation, typically a fast Fourier transformation (FFT) is carried out on the sensed signals (step S407). The frequency domain is actually preferable for determining acoustic transfer functions to obtain the acoustic response of the transducers to external excitations to build up the acoustic signature (e.g. comprising phase differences for the various transducers) in the look-up table.

The Fourier transformed data obtained after step S407 corresponds to the sensed data in step S303 of the method according to the first embodiment illustrated in FIG. 3 so that, in the next step S409 of the second embodiment, the Fourier transformed data is fit to satisfy the Helmholtz Equation and the wave dispersion relation, preferably using a Bessel Function expansion to the Nth order.

The description of the details concerning the fitting step will not be repeated again but reference is made to the corresponding description of step S309 of the first embodiment above. By fitting the measured data, noise contributions not satisfying the Helmholtz equation are thus suppressed leading to an improved quality of the sensed signals.

Step S411 and S413 of the method according to the second embodiment correspond to method steps 311 and 313 of the first embodiment, thus consist in exchanging the measured data by the fitted values and determining acoustic responses and acoustic signatures based thereon.

To further improve the methods according to the first and second embodiments, the modeling could furthermore comprise an attenuation function to take into account the attenuation of the bending waves when travelling through the interaction surface.

The methods as described in FIGS. 3 and 5 are used to calibrate touch sensitive devices based on sensing acoustic signals and comparing them to predetermined acoustic signatures. To carry out the method, either a wave parameter sensing means, such as a vibrometer or a non-touch based laser interferometer are used to sense wave parameters at the grid location for which acoustic signatures have to be determined (embodiment 1) or a robotized tap device is used to provide predetermined excitations at the various grid locations (embodiment 2). The touch sensing device 201 together with the wave parameter measuring means or the predetermined excitation providing means form a calibration system according to a seventh and eighth embodiment of the invention. The data analysis can preferably by realized using a computer program product.

Various specific embodiments of the invention have been described and shown. Many changes, modifications, variations, combinations, subcombinations and other uses and applications of the subject invention will, however, become apparent to those skilled in the art after considering this specification and the accompanying drawings which disclose the preferred embodiments thereof. These and other changes, modifications, variations and other uses and applications, according to various specific embodiments, which do not depart from the spirit and scope of the invention are deemed to be covered, and limited only by the claims.

What is claimed is:

1. A method for reducing noise in a signal sensing a bending wave propagating in an object comprising the steps of:
   a) causing, via a control unit of a touch sensing device, at least one bending wave to propagate through a touch sensing device;
   b) receiving one or more sensed signals, via the control unit of the touch sensing device, representative of a plurality of locations of the object; and
   c) fitting a function satisfying bending wave propagation properties to the one or more sensed signals, thereby reducing noise contributions to the one or more sensed signals not satisfying the bending wave propagation properties, wherein the bending wave propagation properties comprise properties configured to satisfy the Helmholtz equation, and wherein a bending wave dispersion relation $$k = \sqrt{\omega}\left[\frac{12(1-\upsilon^2)\rho}{Eh^2}\right]^{1/4},$$

with ω being the angular frequency of the bending wave propagating in the object, E, υ and ρ being respectively the modulus of elasticity, the Poisson's ratio and the density of the object and h being the thickness of the object, is satisfied by the fitting function.

2. The method according to claim 1, wherein the object is a uniform plate with a thickness less than the bending wave wavelength and step c) comprises fitting a function satisfying the Helmholtz equation to the one or more sensed signals.

3. The method according to claim 1, wherein fitting is carried out for a given location on the object based on the one or more sensed signals corresponding to the given location and a predetermined amount of neighboring locations for which one or more sensed signals have been received.

4. The method according to claim 1, wherein step a) comprises providing a bending wave in the touch sensing device using a piezoelectric transducer located at a first transducer position on the touch sensing device, wherein step b) comprises sensing at least one signal at one or more locations on the touch sensing device different to the first transducer position and wherein the one or more sensed signals represent a bending wave parameter at the one or more locations.

5. The method according to claim 1, comprising step b2) of providing a predetermined touch event at a location of the object, and step a) comprises sensing the one or more sensed signals using a piezoelectric transducer at a first position of the object different to the plurality of locations of the object.

6. The method according to claim 2, wherein the function used in step c) is a Bessel function or an expansion of the Bessel function up to an order n.

7. The method according to claim 2, wherein the fitting function further comprises a bending wave attenuation contribution.

8. The method according to claim 3, wherein the one or more sensed signals are received from node locations of a grid and for each location the fitting step is carried out for a sub-grid with the center of the sub-grid being the location for which the fitting is carried out.

9. The method according to claim 4, wherein the step b) comprises sensing the at least one signal using one of a non-contact laser interferometer and an atomic force microscope.

10. The method according to claim 4, wherein a) and b) are repeated for providing a plurality of bending waves with different frequencies within a predetermined frequency range and sensing signals for each one of the bending waves.

11. The method according to claim 4, wherein step a) further comprises providing a continuous oscillating voltage to the transducer with angular frequency $\omega$.

12. The method according to claim 4, wherein the transducer is positioned outside of an area of interest of the touch sensing device.

13. The method according to claim 4, further comprising a step d) of replacing the one or more sensed signals by the fitted values and a step e) of determining acoustic transfer functions for each location of the touch sensing device for which a fitted value has been established in step a) with respect to the first transducer position.

14. The method according to claim 4, comprising repeating steps a) and b) for a plurality of transducers placed at different positions of the touch sensing device.

15. The method according to claim 5, wherein steps b2) and a) are repeated for a plurality of locations of the object, before proceeding with step c).

16. The method according to claim 13, wherein step e) comprises determining phase differences between acoustic responses of two different transducers.

17. A method for reducing noise in one or more signals sensing at least one bending wave propagating in a touch sensing device comprising:
    causing, via a control unit of the touch sensing device, the at least one bending wave to propagate through the touch sensing device;
    determining a plurality of locations of the one or more signals sensing the at least one bending wave; and
    fitting a function satisfying bending wave propagation properties to the one or more signals, received via the control unit of the touch sensing device, thereby reducing noise contributions to the one or more signals not satisfying the bending wave propagation properties, wherein the bending wave propagation properties comprise properties configured to satisfy the Helmholtz equation, and wherein a bending wave dispersion relation $$k = \sqrt{\omega}\left[\frac{12(1-v^2)\rho}{Eh^2}\right]^{1/4},$$

with $\omega$ being the angular frequency of the bending wave propagating in the object, E, $\upsilon$ and $\rho$ being respectively the modulus of elasticity, the Poisson's ratio and the density of the object and h being the thickness of the object, is satisfied by the fitting function.

* * * * *